Dec. 1, 1936.  C. H. MATZ  2,062,468
OPTICAL DEVICE
Filed July 26, 1934   3 Sheets-Sheet 1
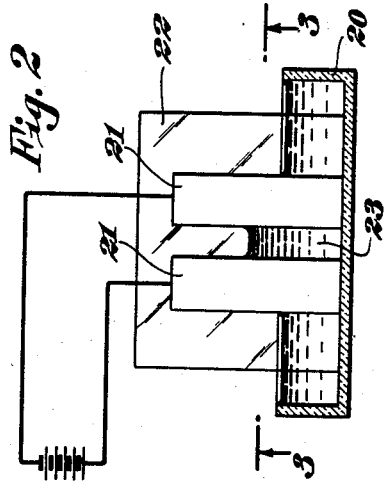
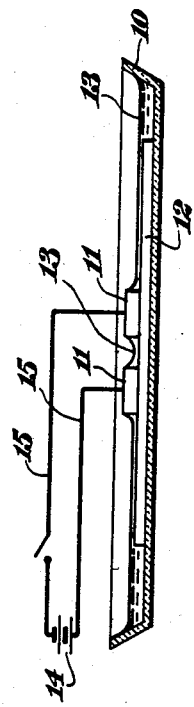
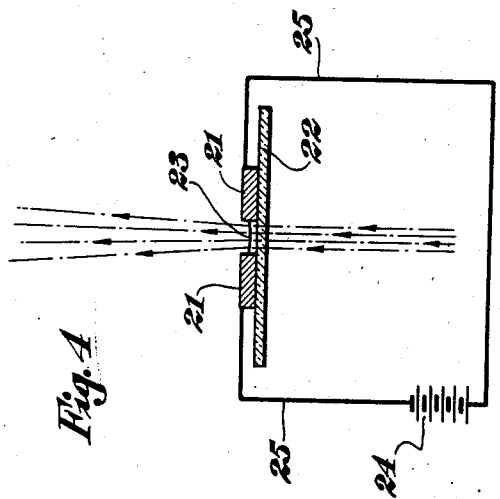
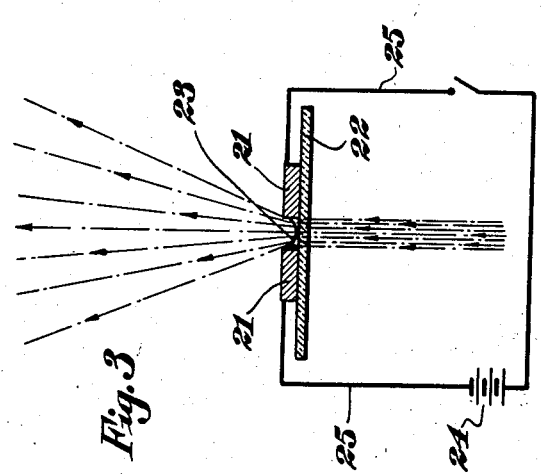
INVENTOR
Charles H. Matz
BY Warfield & Brown
ATTORNEYS Dec. 1, 1936.  C. H. MATZ  2,062,468
OPTICAL DEVICE
Filed July 26, 1934  3 Sheets-Sheet 2
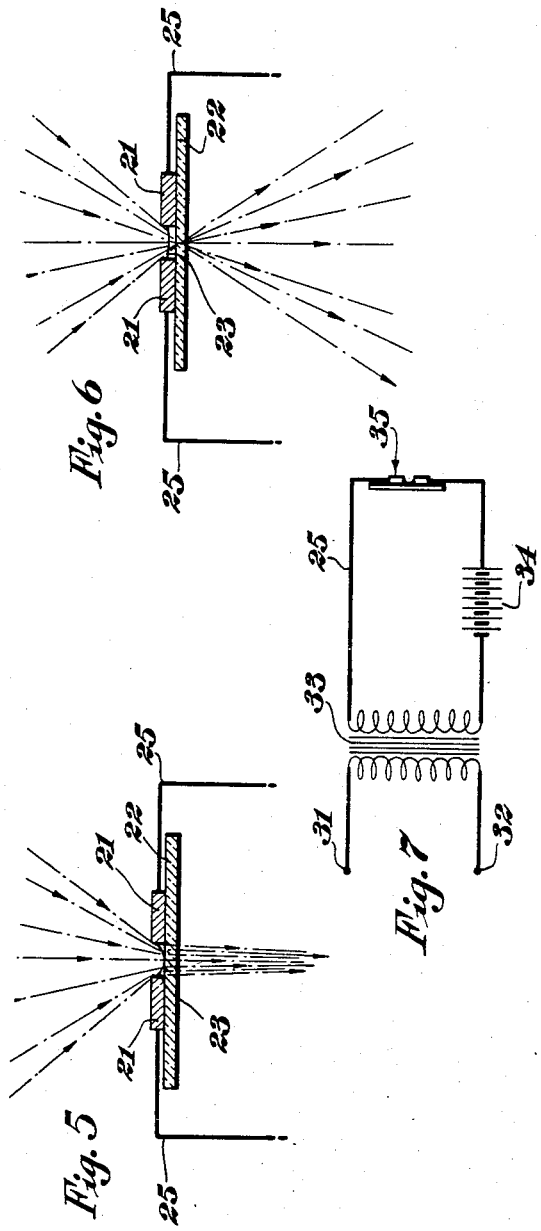
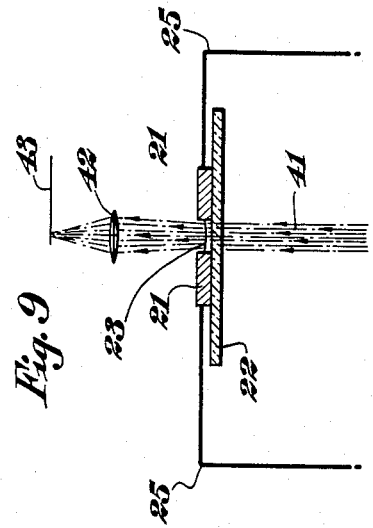
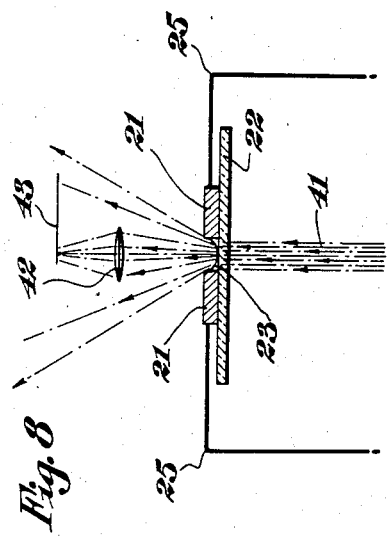
INVENTOR
Charles H. Matz
BY Warfield & Brown
ATTORNEYS Dec. 1, 1936. C. H. MATZ 2,062,468
OPTICAL DEVICE
Filed July 26, 1934 3 Sheets-Sheet 3
Fig.10
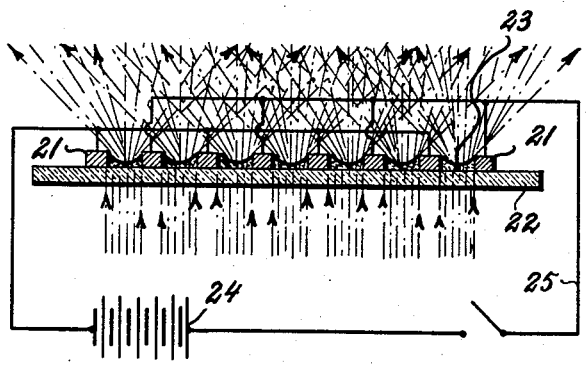
Fig.12
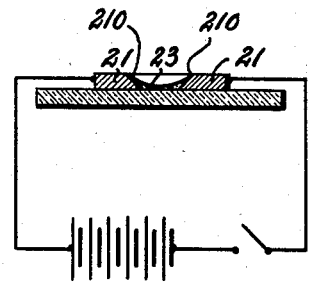
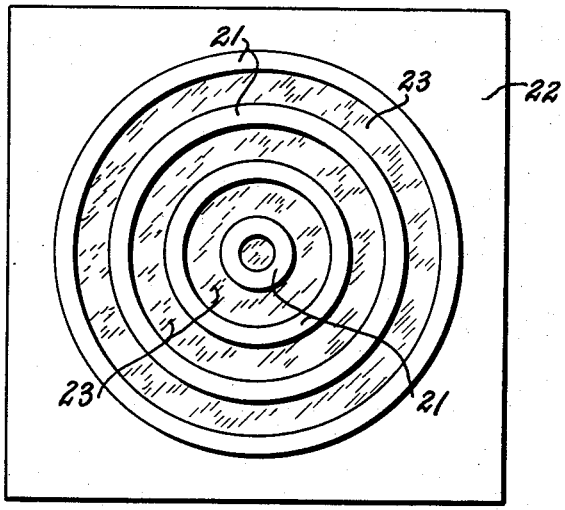
Fig.11
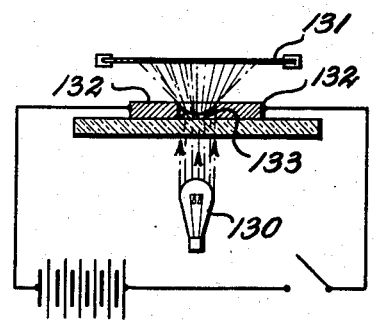
Fig.13
INVENTOR
Charles H. Matz,
BY
Harfield & Brown
ATTORNEY Patented Dec. 1, 1936

2,062,468

UNITED STATES PATENT OFFICE 2,062,468

OPTICAL DEVICE

Charles H. Matz, Winnetka, Ill., assignor of two-fifths to Edwin H. Land, Wellesley Farms, Mass.

Application July 26, 1934, Serial No. 736,985

14 Claims. (Cl. 88—61)

This invention relates to a new and improved optical device, and more particularly to a device adapted to modify the characteristics of a transmitted beam of light in response to the intensity of an impressed electrical potential.

It is an object of the invention to provide means interposed in the path of a beam of light and responsive to the intensity of an impressed electrical potential and adapted for varying the vergency, i. e. the divergence or convergence, of the transmitted beam.

It is a further object of the invention to provide a device of the character described adapted to vary the intensity of a transmitted beam of light.

A further object of the invention is to provide an optical apparatus comprising a liquid lens, of varying focal length or power, responsive to the intensity of an impressed electric potential.

A still further object of the invention is to provide, in combination, a plurality of spaced electrodes, and a liquid forming therebetween a lens of focal length or power controlled by the intensity of the electric field between the electrodes, whereby the intensity or vergency of a beam transmitted through said liquid may be controlled.

Other objects of the invention will in part be obvious and will in part appear hereinafter.

The invention accordingly comprises the features of construction, combination of elements, and arrangement of parts, which will be exemplified in the construction hereinafter set forth and the scope of the application of which will be indicated in the claims.

For a fuller understanding of the nature and objects of the invention, reference should be had to the following detailed description taken in connection with the accompanying drawings, in which:

Fig. 1 is a somewhat diagrammatical representation, partially in cross section, of apparatus embodying one modification of the invention;

Fig. 2 is a somewhat diagrammatical representation in elevation of a second modification of the invention in which the direction of propagation of the beam acted upon is normal to the surface of the paper. In every other figure the direction of propagation of the beam is parallel to the plane of the surface of the paper.

Fig. 3 is a cross-sectional view of the device shown in Fig. 2 taken along the line 3—3 before the application of an electrical field thereto and with the device so arranged with respect to the direction of the transmitted beam of light that the flux density of the beam is increased and its divergence decreased by the application of an impressed field;

Fig. 4 is a similar view of the device shown in Fig. 3 after the application of an electric field thereto;

Fig. 5 is a view similar to Fig. 3 illustrating the device used in such a way that the intensity of the transmitted beam is a maximum and its divergence a minimum without the impressed field;

Fig. 6 is a view of the device shown in Fig. 5 after the field has been impressed thereon and the divergence of the transmitted beam increased;

Fig. 7 is a diagrammatical representation of apparatus in combination with an optical device of the character described for biasing the device with a fixed electrical potential difference;

Fig. 8 is a somewhat diagrammatical representation of an optical system embodying the invention and comprising a liquid lens of the type shown, for example, in Fig. 3, and apparatus in conjunction therewith for utilizing the variance in vergency of the beam transmitted through the lens, showing such a system before an electric field has been impressed upon the lens, and where the transmitted beam has a maximum divergence;

Fig. 9 is a view similar to Fig. 8 of the structure shown therein after a maximum electric field has been impressed upon the liquid lens and the divergency of the transmitted beam reduced to a minimum;

Fig. 10 is a cross-sectional view of a device embodying a modified form of the invention;

Fig. 11 is a somewhat diagrammatical representation in plan view of a further modification of the invention;

Fig. 12 is a cross-sectional view of a still further modification of the invention wherein the electrodes are provided with beveled or inclined surfaces; and Fig. 13 is a somewhat diagrammatical cross-sectional view of an application of one form of the invention to a device for recording an exposed path of varying width on a film.

This invention contemplates primarily the use of a light-transmitting liquid positioned between a plurality of electrodes, as a lens of varying focal length or power, to alter the intensity or the vergency of a beam of light transmitted therethrough. The alteration in the intensity or vergency of the beam is effected by an alteration in the curvature of the surface of the liquid lens, which in turn is caused by an alteration in the intensity of the electric potential impressed upon the liquid between the electrodes.

In Fig. 1 of the drawings one modification of the invention is shown in which 10 represents any suitable container having a transparent base portion beneath the spaced electrodes 11. The container may be of any suitable material, as for example glass. The electrodes 11 are preferably of any conducting material, as for example copper, brass, aluminum, or iron. They are positioned, as for example by fastening them either directly to the base of the container 10 or to a thin plate of glass 12, so as to provide a slot between the two electrodes. This slot should preferably be of such a width that a liquid 13 positioned therein between the electrodes presents an upper surface which is curved over its entire width. Preferably the slot is of such width only, however, as to permit the passage of an adequate beam of light, the electrodes being so closely placed as to permit the use of a relatively small potential difference. It has been found that if the electrodes are positioned so as to provide a slot approximately .020 inch in width the device will function admirably. The slot should preferably be of such depth as to permit full utilization of the curvature of the surface of the liquid 13 between the electrodes 11. For example, a slot having a width of .020 inch and a depth of one-eighth of an inch has been found satisfactory. It will be obvious that great variations in both the width and depth of the slot may be employed.

Means are provided, as for example a battery 14 and lead-in wires 15, for impressing an electrical potential difference between the electrodes 11 and across that portion of the liquid lying therebetween. Before the potential difference is impressed between the electrodes the liquid 13 is caused in general, by surface tension and capillary action, to present a concave surface, as shown for example in Fig. 1. If a parallel beam of light is projected upwardly through the device between the electrodes, this surface of the liquid acts as a negative lens to diverge the beam. If now a potential difference is impressed between the electrodes 11 and across the liquid lying therebetween, the effect upon the beam of light transmitted upwardly through the liquid is to decrease the degree of divergence depending upon the intensity of the impressed electric field to a point where the liquid lens acts substantially as a lens with zero power, so that the transmitted beam of light possesses the same characteristics as the incident beam.

For example, in a device such as is shown in Fig. 1, where the slot had a width of about .020 inch and where ethyl acetate was employed as the liquid forming the negative lens, with zero potential difference between the electrodes a beam of light passing through the lens was projected so as to form a band approximately two inches in width at a distance of two inches from the lens. With an increase of potential difference the width of the transmitted beam decreased somewhat proportionally to the increase of potential until with a potential difference of about 500 volts the width of the transmitted band of light was only about one-eighth of an inch. In connection with the experiment just described the current employed was negligible, being probably only a few microamperes. The device described is therefore essentially an electrostatic instrument, and the power consumed by it is negligible.

In Fig. 2 is shown a modification of the invention in which the electrodes 21, with their supporting glass plate 22 forming a capillary channel, are mounted in an upright manner in any suitable container 20 instead of resting horizontally on the transparent base of the container, as shown in Fig. 1. Where the device is used in this form the liquid 23, acting as a variable lens, is raised by the capillary action between the electrodes an appreciable distance above the surface of the liquid in the container. It is to be understood that the meniscus shown at the top of the column of liquid between the electrodes 21 in Fig. 2 is not the meniscus shown between the electrodes 11 of Fig. 1 or the electrodes 21 of Figs. 3 and 4. The meniscus shown in Fig. 2 is merely that which is normally present at the top of a capillary column, and it is not employed primarily to act upon a transmitted beam. The meniscus which is employed to cause a vergence change in the transmitted beam is not shown in Fig. 2, but is shown in Figs. 3 and 4.

In Fig. 3 is shown a cross-sectional view of the device shown in Fig. 2 along the lines 3—3 and in a plane perpendicular to the plane of the drawings, i. e., a cross-section of the device shown in Fig. 2 taken at a point above the surface of the liquid in the container proper but below the upper end of the column of liquid between the electrodes. The device is shown before an electric field is impressed thereon, and while the exposed surface of the liquid forming the variable lens is shaped by surface tension and capillary action in a concave manner.

In Fig. 4 the same device is shown after the field has been impressed and the liquid lens flattened thereby. In these figures 24 represents the source of potential, and 25 the lead-in wires.

In Figs. 3 and 4 the dotted lines bearing arrows are indicative of the direction taken by beams of light passing first through the supporting glass plate, then through the liquid lens. It will be noted that before the impressment of the potential the lens acts as a negative lens to greatly diverge the incident beam, and that after the impressment of the potential the lens acts more nearly as a lens of zero power and transmits the incident beam substantially without change.

In Figs. 5 and 6 the device shown in Figs. 3 and 4 is illustrated as though used with an incident beam converging sharply upon the liquid lens, as distinct from its use with a substantially parallel beam, as shown in Figs. 3 and 4. Where a converging incident beam is employed, the device acts to decrease the convergence of the beam when not under the influence of an impressed field, and acts substantially as a lens of zero power to transmit the beam without change when under the influence of the full field. If the device is employed with a diverging beam incident thereon, it acts to increase the divergence of the beam when not under the influence of the field, and acts substantially as a lens of zero power to transmit the beam without change when under the influence of the full impressed field.

It will be obvious that in the description of the device references to the action of the device as a lens of substantially zero power are to be understood as referring to the condition of the device when subjected to a maximum effective electric field, and that the device will operate satisfactorily where the alterations in the characteristic of the liquid lens are small, and even though the lens is not caused to approximate a lens of zero power.

It has been found desirable at times to operate devices of the character described with a bias impressed upon the liquid lens. In Fig. 7 a circuit is shown to effect this result, in which 31 and 32 represent lead-in wires, 33 a transformer, and 34 a source of constant potential difference in circuit with the liquid lens 35 and adapted for impressing a constant bias upon the lens. With such a set-up alterations in the current in the lead-in wires give rise to induced alterations in the potential of the secondary circuit comprising the liquid lens, with the result that the lenticular characteristics of the lens are altered and its effect upon the transmitted beam changed. It will be obvious that many other standard methods of biasing may be employed with this new type of light valve.

In Figs. 8 and 9 an optical system is disclosed illustrating one possible use of the new valve. In these drawings, as in Figs. 3, 4, 5 and 6, the numeral 21 represents the conducting elements forming with their non-conducting, transparent, supporting plate 22 a capillary channel, within which the transparent, dielectric liquid 23 rises to act as a lens on the transmitted beams 41. Adjacent this liquid lens a suitable positive lens 42 may be positioned adapted to focus an image of the slit between the electrodes 21, or as shown, an image of the light source, on a recording film or other suitable surface 43. With such an apparatus, when the liquid lens is not subjected to an impressed electric field it acts as a negative lens to diverge the transmitted beams of light so that only a relatively small amount of the transmitted light falls upon the lens 42 and is focused thereby upon the recording film 43. The image of the light source thus made on the film is a faint image. As an electric potential is impressed upon the liquid lens and its lenticular characteristics altered, so that it assumes more nearly the characteristics of a lens of zero power, the divergence of the transmitted beam of light is reduced so that more and more light falls upon the lens 42 and is focused thereby upon the recording film 43, until a maximum condition is reached, as shown for example in Fig. 9, where substantially all of the light transmitted through the liquid valve is focused upon the recording film. When this condition is reached the intensity of the image of the light source which is recorded on the film 43 is a maximum.

It will be understood also that substantially the same results are to be obtained if instead of a lens 42 interposed in the path of the transmitted beam and between the liquid lens and the recording strip, an opaque element is interposed with a slot in registry with the recording film and the slit between the electrodes 21. The light which passes through such a slot and which is recorded on the film will have a varying intensity, depending upon the condition of the liquid lens, which in turn, as has been pointed out, is a direct function of the intensity of the impressed potential thereon.

It will be understood also that the device may be employed to record a strip of varying width upon a suitable recording film. If for example the film 43 in Figs. 8 and 9 is brought closely adjacent the liquid lens 23, and if the lens 42 is removed from the optical system, then the divergence of the beam transmitted by the liquid lens 43 will be recorded directly upon the recording film, so that the record of alterations in the impressed potential across the liquid lens will be formed as an exposed strip of varying width upon the recording film.

The device has been described as comprising a plurality of electrodes mounted upon a non-conducting transparent support with a fluid positioned between the electrodes and reacting to the impressment of an electric field so as to present an altering surface curvature in the path of a transmitted beam of light. The device will function also if the supporting plate for the electrodes is omitted, in which case the fluid will rise between the electrodes by capillary action and will present a double lens face to a transmitted beam. It is thought, however, that the form shown in the drawings and described above, i. e., with the supporting glass plate, is to be preferred. If the double lens face of the liquid lens is desired, it may better be secured by using a single glass plate support with electrodes mounted on each face thereof so that two columns of liquid are provided.

It will be obvious also that the lenticular effect may be secured if desired in a great variety of ways. For example, a plurality of slots may be employed so that beams passing therethrough may commingle in the dispersed condition and may be separated when a potential is impressed on the liquid lenses. Such a structure is shown, for example, in Fig. 10, where 21 represents the electrodes, 22 the supporting glass plate, 23 the fluid between the electrodes, 24 a source of potential, and 25 conductors leading to the electrodes. As shown in the figure, the liquid lenses between adjacent pairs of electrodes are concave and the transmitted beam is scattered at each liquid lens. When a suitable supplementary lens is employed with such a device, i. e., a device using a multiplicity of liquid lenses, the transmitted beam, when the field is not impressed on the liquid lenses, will be diffuse and cannot be brought to a focus at the focal point of the said lens. When, however, the field is impressed on such a device a plurality of substantially parallel intense beams are transmitted which may be brought to a focus at the focal point of the said lens.

A plurality of ring-shaped electrodes may be employed with circular slots therebetween to secure the transmission of, for example, concentric beams, which may be diffuse and diverging or intense and substantially parallel, depending upon the intensity of an impressed electric potential. Such a device is shown somewhat diagrammatically in plan in Fig. 11, where 21 represents the electrodes and 23 the concentric circular capillary channels therebetween. In connection with this figure it is to be understood that the direction of the transmitted beam would be at right angles to the plane of the paper on which the figure appears. It will be obvious that any desired shape of electrode may be employed.

While the electrodes have been shown as provided with substantially perpendicular faces forming the side walls of the slot containing the liquid lens, it will be understood that electrodes of other shapes may be employed. For example, the faces forming the slot may be curved or angularly positioned with respect to each other. Such a device is shown in cross section in Fig. 12, where the electrodes 21 are shown with inclined faces 210, which form the side walls of the capillary channel holding the liquid 23. It will be understood also that the electrodes may be small and the capillary action secured by other elements associated therewith. For example, in Fig. 2 the plates 21, which are shown as electrodes, may, if desired, be plates of other material, as for example glass, coated with a conducting material to form electrodes along the sides of that portion of the slot which is to be employed to transmit light.

It will be understood also that while the depth of the slot has been described as more or less uncritical, provided it is of sufficient depth to permit adequate curvature of the surface of the material therein, it may be desired to employ a slot of such depth, and material within the slot of such depth, that the surface tension of the material causes the apex of the curvature of the surface to lie approximately upon the supporting glass plate so that at that region the fluid within the trough forms merely a film upon the plate.

While the operation of the device has been described as adaptable primarily to an alteration in the surface curvature of the liquid lens, it is to be understood that there are other associated effects which may contribute largely to the successful operation of the system, and may be important in the modulation of some frequences. The electrocapillary rise and fall of the fluid in the slot where the device is employed, for example, as shown in Fig. 2, may be employed to augment the modulating effect of the alteration in the lenticular structure of the fluid. This capillary rise and fall is, however, probably relatively slow, and where the device is used as a light valve with high frequencies, it probably has little effect.

Where a liquid is employed in the device which absorbs certain wave lengths of the transmitted beam, the device may be effective to alter the intensity of the beam because of the alteration in the effective thickness of the film of liquid interposed in the path of the beam at the center of the slot with the impressment of the electric potential.

The fluids employed in the valve are preferably light-transmitting, low-viscosity fluids of low electrical conductivity. For example, ethyl acetate is an excellent fluid. A wide variety of liquids have been found usable, however, such for example as methyl alcohol, ethyl alcohol, ether, carbon tetrachloride, methyl acetate, distilled water, glycerine, nitrobenzene, and some oils.

The device which has been described and which has been termed a liquid lens of variable focal length has many other applications. It may be employed, for example, as an electrostatic voltmeter, as the alteration in the divergence or convergence of a transmitted beam is a function of the intensity of the impressed field. The device may be employed in connection with suitable apparatus for the transmission of audible or other signals over a beam of light. When the device is employed in connection with transmission of audible signals it may be said to modulate the beam of light at audible frequencies, and where such an expression is used in the claims it should be so interpreted. It is admirably adapted for use in sound-recording on motion picture film. In this connection it may be used in the manner already described in connection with Figs. 8 and 9 as either a variable density device or a variable width recording device.

Where employed in the first manner, i. e., as a variable density recording device, the electro-optical slit, i. e., the liquid lens itself, may be positioned at some distance from a second slit of constant width, which in turn is positioned closely adjacent the recording film or focused thereon by an auxiliary lens. With such an apparatus the width of the beam passing through the second slit and falling upon the recording film remains constant, while the intensity of the light passing therethrough will vary with the divergence and convergence of the beam transmitted through the electro-optical slit or liquid lens.

Where the device is employed as a variable width-recording device, certain precautions should be taken. Either the light source should be so bright that the beam recorded on the film will over-expose the film even where the beam is diverging so as to form a record of maximum width on the film, so that when the film is developed all portions which have been exposed at all will give a substantially uniform appearance of over-exposure, or else a film should be employed and/or a method of development used which will give a maximum contrast between all exposed portions of the film and all unexposed portions thereof.

In Fig. 13 a somewhat diagrammatical representation of apparatus adapted for the exposure of a strip of varying width on a film is shown. In that figure 130 may represent a light source of such intensity that the exposed portion of a film 131 is always over-exposed. A ray of light emanating from the light source will traverse the capillary channel between the electrodes 132 and impinge upon the film 131. If the circuit comprising the electrodes is open, as shown in Fig. 13, or if a minimum potential is impressed across the electrodes, the beam will be spread by the liquid lens 133 between the electrodes, thus exposing a wide portion of the film 131. As the film is carried past the lens and the potention across the electrodes is varied, the width of the exposed portion of the film will be correspondingly altered, so that when the film is developed an exposed track of varying width will appear.

Suitably designed apparatus embodying the structure of the invention may be sealed up so as to substantially prevent evaporation of the liquid forming the lens and/or liquids with very low vapor pressure may be employed.

Several methods of supplying liquid to the slot between the electrodes have been disclosed. It is to be understood that any other method, such, for example, as leading the liquid to the slot by means of a wick, may be employed.

While the device has been described as acting upon a beam of light to alter its vergence, it is to be understood that the device will function in a similar way on electromagnetic radiation outside the visible spectrum where liquids are employed in the device which transmit such frequencies. Accordingly nothing herein is to be deemed as limiting the invention to the use of apparatus with radiation in the visible spectrum range.

The device which has been described is astonishingly sensitive to small alterations in intensity of the impressed field. It is furthermore exceedingly stable and sturdy mechanically. It shows little tendency to heat up during operation because the liquids employed can have a very low conductivity and a low-absorption coefficient for the light transmitted.

Other applications of the device will be obvious. The optical systems which have here been described comprising the liquid lens as an element are to be understood as typical merely of a great variety of systems in which the device may be satisfactorily employed.

Since certain changes may be made in the above construction and different embodiments of the invention could be made without departing from the scope thereof, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent, is:

1. Means for modulating a light beam at audible frequencies comprising a plurality of elements forming a capillary channel having opposite electrically-conductive portions, a light-transmitting dielectric liquid therebetween and exposed on one surface to another fluid of different refractive index, and interposed in the path of said beam, and means to impress an electric potential on said liquid.

2. A light valve comprising a plurality of elements forming a capillary channel comprising elements having opposite electrically-conductive portions and a substantially non-conducting support therefor, a light-transmitting liquid of low electrical conductivity within said channel and providing a curved surface in the path of transmitted beams, and means to impress an electric potential difference thereon whereby the lenticular characteristics of said liquid are altered.

3. A light valve comprising a plurality of elements forming a capillary channel comprising elements having opposite electrically-conductive portions and a transparent, substantially non-conducting support therefor, a light-transmitting liquid of low conductivity within said channel and providing a curved surface in the path of transmitted beams, and means to impress an electric potential difference thereon whereby the lenticular characteristics of said liquid are altered.

4. A light valve comprising a plurality of electrodes, a substantially non-conducting support therefor forming therewith a capillary channel, a liquid dielectric positioned within said channel and providing a curved surface not in contact with said non-conducting support, and means to impress an electric potential difference thereon, the distribution of said dielectric within said channel and the curvature of said surface varying with the impressed potential.

5. A light valve comprising a plurality of elements forming a capillary channel having opposite electrically-conductive portions, a substantially non-conducting light-transmitting liquid therebetween, a portion of said liquid forming a meniscus in contact with a fluid having an index of refraction differing from that of said liquid, means to impress an electric bias on said liquid, and means to superimpose thereon an additional modulating electric potential.

6. In combination, in an optical system, a liquid lens positioned between a plurality of electrodes, and means for impressing an electric potential thereon whereby the optical properties of said system are altered by altering the curvature of said lens.

7. In combination in an optical system, a liquid lens positioned between a plurality of substantially vertical electrodes, and means for impressing an electric potential thereon whereby the optical properties of said system are altered by altering the curvature of said lens.

8. A light valve comprising a plurality of elements forming a capillary channel, said plurality comprising in part at least electrically conductive elements, a liquid dielectric positioned within said channel, and means for altering the distribution of said liquid within said channel and comprising means to impress an electric potential difference upon a plurality of said conductive elements.

9. In combination, in an optical system, a negative liquid lens positioned between a plurality of electrodes, and means for impressing an electric potential thereon whereby the curvature of said lens is altered.

10. A substantially electrostatic light control comprising a liquid lens comprising a light-transmitting dielectric positioned between conducting elements comprising a capillary channel, and means for impressing an electric potential on said dielectric for altering its distribution in said channel.

11. In combination, a liquid negative lens supported in a capillary channel, means for altering the curvature thereof, said means comprising electrically-conductive elements adjacent said liquid and on opposite sides of said channel, and means associated therewith and adapted for impressing an electric potential upon said liquid.

12. An electro-optical system comprising a light source, a liquid lens comprising a dielectric material supported within a capillary channel formed by a plurality of elements having opposite electrically-conductive portions adjacent said liquid, means for directing radiation from said light source through said liquid lens, and means for impressing an electric potential upon said lens whereby the vergency of beams transmitted thereby may be altered.

13. In combination a plurality of elements forming a capillary channel, supporting means for said elements to position one end of the channel formed thereby within a reservoir of liquid, light-transmitting, dielectric material whereby a portion of said material is caused to enter said capillary channel, electrically-conductive elements on opposite portions of said channel and adjacent the liquid therein, and means for impressing an electric potential upon said liquid whereby its distribution in said channel is varied.

14. In combination, elements forming a capillary channel, a reservoir of light-transmitting liquid, dielectric material, means for conducting said liquid material from said reservoir to said capillary channel, electrically-conductive elements on opposite portions of said channel and in contact with dielectric material therein, and means for impressing an electric potential difference on the dielectric material within said channel and between said conducting elements, whereby the distribution of said dielectric within said channel is varied.

CHARLES H. MATZ.